G. T. HILLS.
UNIVERSAL LOCK AND RELEASE FOR PULLEYS.
APPLICATION FILED JULY 7, 1919.
1,345,673.  Patented July 6, 1920.
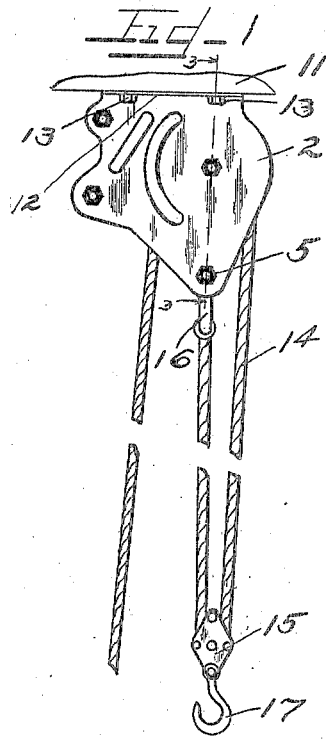
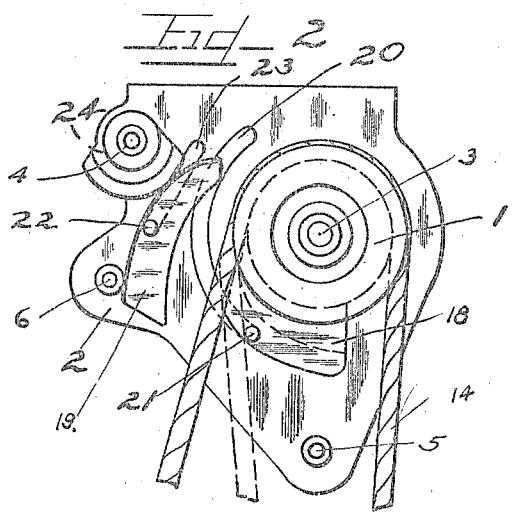
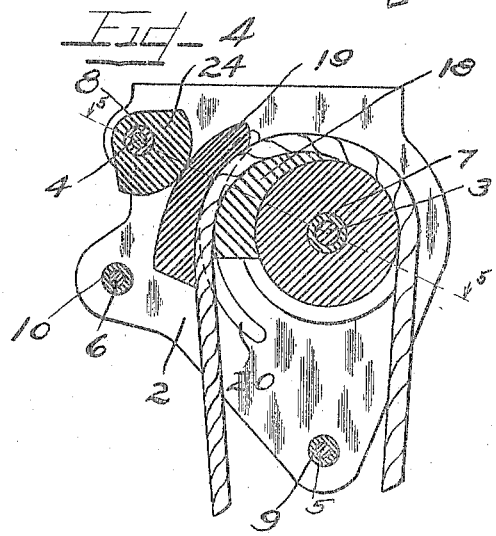
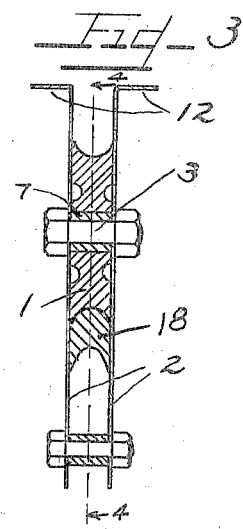
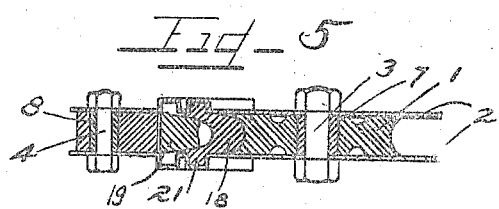
Witnesses
Maurice M. Jackson
Charles W. Hills Jr.
Inventor
George T. Hills
by Charles W. Hills Atty

UNITED STATES PATENT OFFICE.

GEORGE T. HILLS, OF CHICAGO, ILLINOIS.

UNIVERSAL LOCK AND RELEASE FOR PULLEYS.

1,345,673.  Specification of Letters Patent.  Patented July 6, 1920.

Application filed July 7, 1919. Serial No. 309,039.

*To all whom it may concern:*

Be it known that I, GEORGE T. HILLS, a citizen of the United States, and a resident of the city of Chicago, in the county of Cook and State of Illinois, have invented certain new and useful Improvements in Universal Locks and Releases for Pulleys; and I do hereby declare that the following is a full, clear, and exact description of the same, reference being had to the accompanying drawings, and to the numerals of reference marked thereon, which form a part of this specification.

This invention relates to locking and releasing devices for pulleys adapted to clamp the rope, chain or the like passing around the pulley in any desired position.

Heretofore, with clamping devices of this type the wear on the rope has been excessive and the rope was frequently distorted by the clamping action.

It is an object of the present invention to provide a simple and easily operated locking and releasing device for pulleys.

A further object of the invention is to provide means for clamping the rope passing around the pulley with a minimum of friction and wear.

Another object of the invention is to provide means for clamping the rope without distorting its shape.

Other and further important objects of this invention will be apparent from the disclosures in the drawings and specification.

The invention (in a preferred form) is illustrated in the drawings and hereinafter more fully described.

In the drawings:—

Figure 1 is a side elevation of a pulley and housing therefor embodying the features of the present invention.

Fig. 2 is a side elevation of the same with one half of the housing removed.

Fig. 3 is a section on the line 3—3 of Fig. 1.

Fig. 4 is a section on the line 4—4 of Fig. 3.

Fig. 5 is a section on the line 5—5 of Fig. 4.

As shown in the drawings:—

The device comprises a pulley wheel 1, mounted in a housing consisting of two plates 2, secured together by bolts 3, 4, 5, and 6. Sleeves 7, 8, 9 and 10 on these bolts are provided to hold the plates in spaced relation.

When the device is designed to be secured to a ceiling or the like, 11, the upper edges of the plates 2, may conveniently be flanged as at 12 for attachment to the ceiling by bolts 13.

A rope, chain or the like 14 is passed around the pulley wheel 1, then through a hanging sheave 15, back to a shackle 16, secured to the bolt 5. The other end of the rope hangs freely from the pulley housing. A hook 17 may conveniently be provided for attachment to the article to be lifted.

After the article has been raised by pulling on the free end of the rope it is desirable to be able to clamp the rope so that the article will remain suspended.

This may be accomplished in various ways. In the particular form of construction shown two wedge members 18 and 19 are provided for this purpose. One of these wedge members 18 is curved on one face to fit the periphery of the pulley 1, and is arranged to move in a circle, concentric with the pulley. To guide the wedge 18, arcuate recesses 20, are stamped in each of the plates 2, for the reception of lugs 21, extending laterally from each side of the wedge 18. Normally, under the action of gravity, the wedge 18 assumes the position shown in Fig. 2, beneath the pulley.

In this position the rope when held at the angle shown in full lines in Fig. 2, does not contact with the wedge member. However, if the rope is moved into the dotted line position it presses the thin end of the wedge against the pulley so that if the rope is allowed to be drawn upwardly by the weight of the article supported by the hook 17, the wedge 18 is drawn upwardly with the rope until the latter is firmly clamped against the other wedge member 19, as shown in Fig. 4.

This second wedge member 19 is preferably, though not necessarily, movable so that it may move with the rope during the clamping movement and thereby reduce the wear on the rope to a minimum. To limit and control this movement of the wedge 19, laterally extending lugs 22, are provided on the wedge for engagement with channels or recesses 23 in the plates 2.

To relieve these lugs of the clamping pressure and also to reduce friction and wear a sector 24, is pivotally mounted on the sleeve 8, surrounding the bolt 4. This sector bears against the upper and outer surface of the wedge 19, and rotates as the latter is drawn upwardly with the rope into the clamping position shown in Fig. 4.

Preferably not only the pulley 1, but also the outer face of the wedge 18, and the inner face of the wedge 19 are grooved to conform to the shape of the rope to prevent distortion of the latter by the clamping action of the wedges.

The operation is as follows:—

The parts are normally in the position shown in Fig. 2. The free end of the rope is pulled down until the article to be lifted has been raised somewhat above its desired height. In this movement the rope is preferably held at such an angle that it does not contact with either of the wedge members. To lock the rope it is first moved inwardly into the position shown in dotted lines in Fig. 2 when the tension in the rope presses the upper thin edge of the wedge against the pulley wheel 1. The rope is then gradually released when the friction of the rope on one side and the friction of the pulley wheel on the other side of the wedge 18 causes the latter to be drawn upwardly with the rope. This movement of the wedge 18 moves the rope outwardly until it contacts with the other wedge 19 when the latter is also drawn upwardly rotating the sector 24 as it moves. The two wedges then move upwardly until the rope is firmly gripped between the two. The rope may be released at any time, by merely pulling on the free end of the rope.

I am aware that various details of construction may be varied through a wide range without departing from the principles of this invention, and I therefore do not purpose limiting the patent granted otherwise than necessitated by the prior art.

I claim as my invention:

1. A device of the class described comprising in combination a tension member, a pulley, a housing therefor including a pair of spaced members, a pair of wedge members between said spaced members on either side of but normally out of contact with said tension member, both said wedge members being adapted to move with the tension member when the latter is brought successively into contact therewith while moving upwardly.

2. A device of the kind described comprising in combination a tension member, a pulley, a housing therefor including a pair of spaced members, a wedge member slidably mounted between the housing members, guideways on each housing member for said wedge member, a second curved wedge member between the housing members normally located below the pulley and adapted to move upwardly around the latter in a path concentric therewith while moving upwardly to clamp the tension member against the wedge member.

3. A device of the kind described comprising in combination a pulley, a housing therefor including a pair of spaced members adapted to allow a cable or line to pass therebetween, a curved wedge member between the housing members normally located below the pulley and adapted to move upwardly around the latter in a path concentric therewith when the cable is brought into contact therewith while moving upwardly, and a second wedge member movably mounted between the housing members and adapted to coöperate and move upwardly with the first wedge member in gripping the cable as the first wedge member moves upwardly around the pulley.

4. A device of the kind described comprising in combination a pulley, a housing therefor including a pair of spaced members, a wedge member, guideways on each housing member for said wedge member, an antifriction device on the opposite side of the wedge member to the pulley, a second curved wedge member between the housing members normally located below the pulley and adapted to move upwardly around the latter in a path concentric therewith when a cable is brought into contact therewith while moving upwardly to clamp the latter against the first wedge member.

5. A device of the kind described comprising in combination a pulley, a housing therefor including a pair of spaced members, a wedge member, guideways on each housing member for said wedge member, a rotatably mounted segment on the opposite side of the wedge member to the pulley, a second curved wedge member between the housing members normally located below the pulley and adapted to move upwardly around the latter in a path concentric therewith when a cable is brought into contact therewith while moving upwardly to clamp the latter against the first wedge member.

In testimony whereof I have hereunto subscribed my name in the presence of two subscribing witnesses.

GEORGE T. HILLS.

Witnesses:
 EARL M. HARDINE,
 CHARLES W. HILLS, Jr.